US011975537B2

(12) United States Patent
Shinkawa

(10) Patent No.: US 11,975,537 B2
(45) Date of Patent: May 7, 2024

(54) LIQUID EJECTING APPARATUS

(71) Applicant: SEIKO EPSON CORPORATION, Tokyo (JP)

(72) Inventor: Osamu Shinkawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 170 days.

(21) Appl. No.: 17/656,896

(22) Filed: Mar. 29, 2022

(65) Prior Publication Data

US 2022/0314614 A1 Oct. 6, 2022

(30) Foreign Application Priority Data

Mar. 31, 2021 (JP) ................................ 2021-060809

(51) Int. Cl.
*B41J 2/045* (2006.01)

(52) U.S. Cl.
CPC ....... *B41J 2/04581* (2013.01); *B41J 2/04588* (2013.01); *B41J 2/04593* (2013.01); *B41J 2/04541* (2013.01)

(58) Field of Classification Search
CPC ................ B41J 2/04581; B41J 2/04588; B41J 2/04593; B41J 2/04541
See application file for complete search history.

(56) References Cited

U.S. PATENT DOCUMENTS 9,205,644 B2 * 12/2015 Hosokawa ........... B41J 2/14274
2015/0077463 A1 3/2015 Hosokawa

FOREIGN PATENT DOCUMENTS

JP 2011-056964 A 3/2011
JP 2015-058540 A 3/2015

* cited by examiner

*Primary Examiner* — Geoffrey S Mruk
(74) *Attorney, Agent, or Firm* — Global IP Counselors, LLP

(57) ABSTRACT

A liquid ejecting apparatus including an ejector configured to eject a liquid with displacement of a piezoelectric element, a generator configured to generate a driving signal, which has a first waveform, for displacing the piezoelectric element in a first direction, and a second waveform, for displacing the piezoelectric element in a second direction opposite to the first direction, and a detector configured to detect a vibration remaining in the ejector in a detection time period starting after completion of the second time period. The difference between a duration from the first time point to the second time point and a duration that is a natural number times the period of a vibration produced in the ejector is shorter than one quarter times the period of the vibration produced in the ejector.

7 Claims, 11 Drawing Sheets

FIG. 7

| Sd[m] | SPECIFICATION CONTENT OF Sd[m] | Qa[m] | | Qb[m] | | | Qs[m] | | |
|---|---|---|---|---|---|---|---|---|---|
| | | TQ1 | TQ2 | TSS1 | TSS2 | TSS3 | TSS1 | TSS2 | TSS3 |
| 1 | DP-1 | H | H | L | L | L | L | L | L |
| 2 | DP-2 | H | L | L | L | L | L | L | L |
| 3 | DP-3 | L | H | L | L | L | L | L | L |
| 4 | DP-4 | L | L | L | L | L | L | L | L |
| 5 | DS | L | L | H | L | H | L | H | L |

LIQUID EJECTING APPARATUS

The present application is based on, and claims priority from JP Application Serial Number 2021-060809, filed Mar. 31, 2021, the disclosure of which is hereby incorporated by reference herein in its entirety.

BACKGROUND

1. Technical Field

The present disclosure relates to a liquid ejecting apparatus.

2. Related Art

A liquid ejecting apparatus, such as an ink jet printer, drives a piezoelectric element provided in an ejector included in the liquid ejecting apparatus by a driving signal to displace the piezoelectric element, which causes a liquid, such as ink, filled in a pressure chamber provided in the ejector to be ejected to form an image on a medium, such as recording paper. In such a liquid ejecting apparatus, an increase in the viscosity of a liquid filled in the ejector may cause an ejection abnormality in which it is not possible to normally eject the liquid from the ejector. If an ejection abnormality has occurred, it becomes not possible to accurately form dots of a liquid ejected from the ejector that are scheduled to be formed on a medium and thus the quality of an image formed on the medium decreases. Therefore, techniques have been proposed in which the ejection state of a liquid in an ejector is determined based on the period of vibrations produced in the ejector driven by a driving signal, so that the decrease in the image quality involved in an ejection abnormality is reduced (for example, JP-A-2015-058540).

With the proposed techniques, when the degree at which the viscosity of a liquid filled in the ejector is increased is insubstantial, it is highly likely that the ejection state in the ejector is not able to be determined accurately.

SUMMARY

A liquid ejecting apparatus according to the present disclosure includes an ejector configured to eject a liquid filled in a pressure chamber in accordance with displacement of a piezoelectric element, a generator configured to generate a driving signal, which has a first waveform, provided in a first time period starting at a first time point, for displacing the piezoelectric element in a first direction, and a second waveform, provided in a second time period starting at a second time point after completion of the first time period, for displacing the piezoelectric element in a second direction opposite to the first direction, and a detector configured to detect a vibration remaining in the ejector in a detection time period starting after completion of the second time period. The difference between a duration from the first time point to the second time point and a duration that is a natural number times the period of a vibration produced in the ejector is shorter than one quarter times the period of the vibration produced in the ejector.

BRIEF DESCRIPTION OF THE DRAWINGS

FIG. 7 is a table illustrating an example of individual specific signals.

DESCRIPTION OF EXEMPLARY EMBODIMENTS

Embodiments for carrying out the present disclosure will be described below with reference to the accompanying drawings. In each of the drawings, the dimensions and scales of elements are appropriately different from those of actual elements. The embodiments described below are desirable specific examples of the present disclosure and therefore are given various limitations that are technically desirable. However, the scope of the present disclosure is not limited to these forms unless the description given below particularly limits the present disclosure.

A. Embodiment

In the present embodiment, an ink jet printer that ejects ink to form an image on recording paper P is exemplified and a liquid ejecting apparatus is described. In the present embodiment, the ink is an example of "liquid" and the recording paper P is an example of "medium".

1. Outline of Ink Jet Printer

With reference to FIGS. 1 to 4, an example of a configuration of an ink jet printer 1 according to the present embodiment will be described below.

Figure 1:
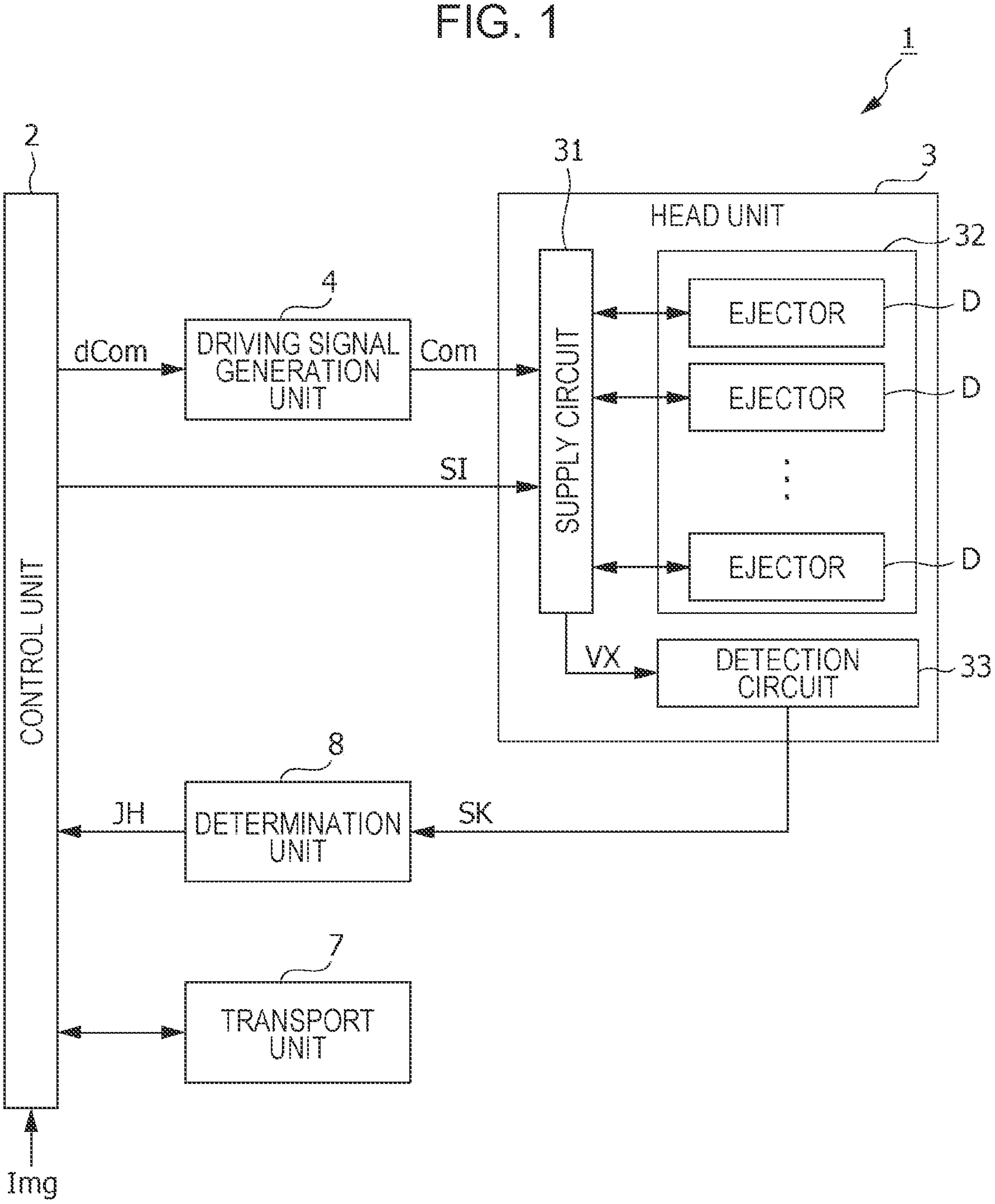
FIG. 1 is a block diagram illustrating an example of a configuration of an ink jet printer according to an embodiment of the present disclosure.

FIG. 1 is a functional block diagram illustrating an example of a configuration of the ink jet printer 1.

As illustrated in FIG. 1, print data Img representing an image to be formed by the ink jet printer 1 is supplied from a host computer, such as a personal computer or digital camera, to the ink jet printer 1. The ink jet printer 1 performs a printing process for forming, on the recording paper P, an image represented by the print data Img supplied from the host computer.

As illustrated in FIG. 1, the ink jet printer 1 includes a control unit 2 that controls components of the ink jet printer 1, a head unit 3 provided with ejectors D that eject ink, a driving signal generation unit 4 that generates a driving signal Com for driving the ejector D, a transport unit 7 for changing a relative position of the recording paper P with respect to the head unit 3, and a determination unit 8 that determines an ejection state of ink in the ejector D.

In the present embodiment, it is assumed that the ink jet printer 1 includes one or more head units 3, one or more driving signal generation units 4 corresponding one to one to the one or more head units 3, and one or more determination units 8 corresponding one to one to the one or more head units 3. However, for convenience of description, as illustrated in FIG. 1, the description given below is focused on one head unit 3 of the one or more head units 3, one driving signal generation unit 4 provided corresponding to the one head unit 3 of the one or more driving signal generation units 4, and one determination unit 8 provided corresponding to the one head unit 3 of the one or more determination units 8.

The control unit 2 includes one or more CPUs. The control unit 2 may include programmable logic devices, such as FPGAs, instead of or in addition to the CPUs. The term CPU is an abbreviated name of a central processing unit and the term FPGA is an abbreviated name of a field-programmable gate array. The control unit 2 includes one or both of volatile memory, such as random-access memory (RAM), and nonvolatile memory, such as read-only memory (ROM), electrically erasable programmable ROM (EEPROM), or programmable ROM (PROM).

As will be described in more detail below, the control unit 2 generates signals for controlling operations of components of the ink jet printer 1, such as a print signal SI and a waveform specification signal dCom.

The waveform specification signal dCom is a digital signal defining the waveform of the driving signal Com. The driving signal Com is an analog signal for driving the ejector D. In the present embodiment, the driving signal Com is assumed to include a driving signal Com-A and a driving signal Com-B. The driving signal generation unit 4, which includes a digital-to-analog (DA) conversion circuit, generates the driving signal Com having a waveform defined by the waveform specification signal dCom. The print signal SI is a digital signal for specifying the type of operations of the ejector D. Specifically, the print signal SI is a signal that specifies the type of operations of the ejector D by specifying whether to supply the driving signal Com to the ejector D.

As illustrated in FIG. 1, the head unit 3 includes a supply circuit 31, a recording head 32, and a detection circuit 33.

The recording head 32 includes M ejectors D. The value M is a natural number that satisfies M≥1. Of the M ejectors D provided in the recording head 32, an mth ejector D may be referred to below as an ejector D[m]. Here, the variable m is a natural number that satisfies 1≤m≤M. Hereinbelow, when, for example, a component, a signal, or the like of the ink jet printer 1 corresponds to the ejector D[m] of the M ejectors, an index [m] may be appended to a reference character designating the component, the signal, or the like.

The supply circuit 31 switches, based on the print signal SI, whether to supply the driving signal Com to the ejector D[m]. Of the driving signals Com, the driving signal Com that is supplied to the ejector D[m] may be referred to below as a supply driving signal Vin[m]. The supply circuit 31 switches, based on the print signal SI, whether to supply a detection potential signal VX[m], which indicates the potential of an upper electrode Zu[m] of a piezoelectric element PZ[m] included in the ejector D[m], to the detection circuit 33.

When the detection potential signal VX[m] is supplied from the ejector D[m] to the detection circuit 33, the ejector D[m] may be referred to below as a determination target ejector DS. The ejectors D other than the determination target ejector DS may be referred to below as non-determination-target ejectors DP.

The piezoelectric element PZ[m] and the upper electrode Zu[m] will be described later with reference to FIG. 3.

The detection circuit 33 generates a detection signal SK[m] based on the detection potential signal VX[m] supplied via the supply circuit 31 from the determination target ejector DS. Specifically, the detection circuit 33 generates the detection signal SK[m], for example, by amplifying the detection potential signal VX[m] to remove the noise component.

The determination unit 8 determines, based on the detection signal SK[m], whether the ejection state of ink in the ejector D[m] is normal, that is, whether the ejector D[m] is in a normal state in which no ejection abnormality has occurred, and generates ejection state determination information JH[m] indicating a result of the determination. The ejection abnormality used herein is a collective term for abnormalities in ejection states of ink in the ejector D[m], that is, states in which the ejector D[m] is not able to accurately eject ink from its nozzle N. For example, the ejection abnormality includes a state in which it is not possible to eject ink from the ejector D[m], a state in which the ejector D[m] ejects ink of an amount different from the ejection amount defined by the driving signal Com, a state in which the ejector D[m] ejects ink at a velocity different from the ejection velocity defined by the driving signal Com, and other states. The process related to determination of the ejection state of ink in the ejector D[m] may be referred to below as an ejection-state determination process. That is, the determination target ejector DS is the ejector D[m] serving as a target of the ejection-state determination process.

When the printing process is performed, the control unit 2 generates signals for controlling the head unit 3, such as the print signal SI, based on the print data Img. When the printing process is performed, the control unit 2 also generates signals for controlling the driving signal generation unit 4, such as the waveform specification signal dCom. When the printing process is performed, the control unit 2 also generates signals for controlling the transport unit 7. Thereby, in the printing process, the control unit 2 controls components of the ink jet printer 1 by, for example, determining whether to eject ink from the ejector D[m], adjusting the amount of ejected ink, and adjusting the timing at which ink is ejected, while controlling the transport unit 7 so as to change the position of the recording paper P relative to the head unit 3, so that an image corresponding to the print data Img is formed on the recording paper P.

When the ejection-state determination process is performed, the control unit 2 generates the print signal SI specifying that the ejector D[m] is to be driven as the determination target ejector DS, and supplies the print signal SI to the supply circuit 31. In this case, the print signal SI specifies that the detection potential signal VX[m] is to be supplied from the ejector D[m] to the detection circuit 33. Then, in the ejection-state determination process, the detection circuit 33 generates the detection signal SK[m] based on the detection potential signal VX[m] supplied from the ejector D[m] driven as the determination target ejector DS via the supply circuit 31. In the ejection-state determination process, the determination unit 8 generates the ejection state determination information JH[m] based on the detection signal SK[m] supplied from the detection circuit 33.

Figure 2:
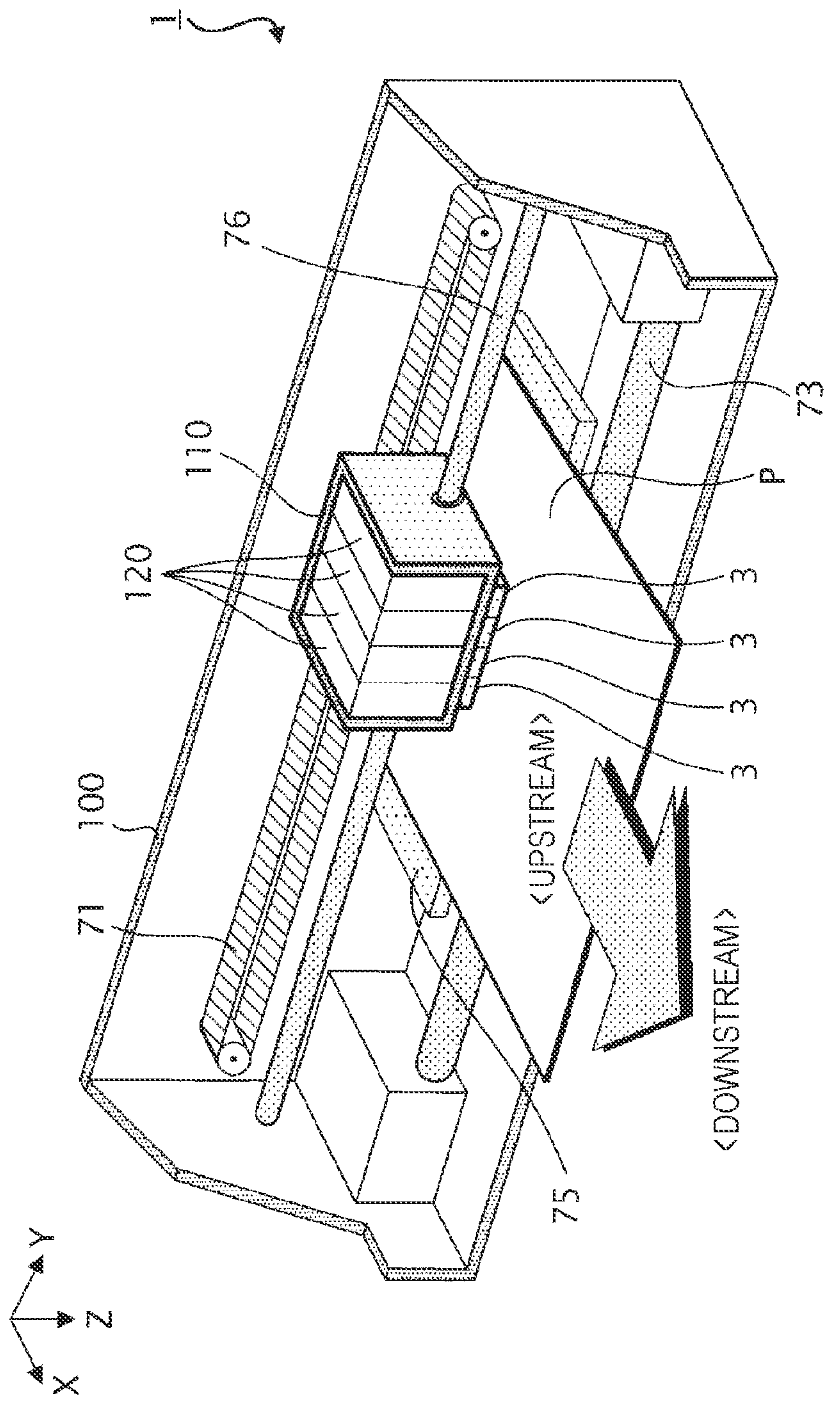
FIG. 2 is a perspective view illustrating an example of a schematic internal configuration of the ink jet printer.

FIG. 2 is a perspective view illustrating an example of a schematic internal configuration of the ink jet printer 1.

As illustrated in FIG. 2, in the present embodiment, it is assumed that the ink jet printer 1 is a serial printer. Specifically, when performing the printing process, the ink jet printer 1 ejects ink from the ejector D[m] while transporting the recording paper P in a sub scanning direction and simultaneously reciprocating the head unit 3 in a main scanning direction intersecting the sub scanning direction, thereby forming dots in accordance with the print data Img on the recording paper P.

Hereinbelow, a +X direction and its opposite direction, a −X direction, are collectively referred to as an "X-axis direction", a +Y direction intersecting the X-axis direction and an opposite direction to the +Y direction, a −Y direction, are collectively referred to as a "Y-axis direction", and a +Z direction intersecting the X-axis direction and the Y-axis direction and an opposite direction to the +Z direction, a −Z direction, are collectively referred to as a "Z-axis direction". In the present embodiment, as illustrated in FIG. 2, a direction from a −X side positioned upstream with respect to a +X side positioned downstream is assumed as the sub scanning direction, and the +Y direction and the −Y direction are each assumed as the main scanning direction. Additionally, in the present embodiment, as illustrated in FIG. 2, the +Z direction is assumed to correspond to the ejection direction of ink from the ejector D[m].

As illustrated in FIG. 2, the ink jet printer 1 according to the present embodiment includes a housing 100 and a carriage 110 capable of being reciprocated in the Y-axis direction within the housing 100. On the carriage 110, one or more head units 3 are mounted.

In the present embodiment, as illustrated in FIG. 2, it is assumed that four ink cartridges 120 corresponding one to one to four colors, cyan, magenta, yellow, and black, are stored in the carriage 110. In the present embodiment, it is also assumed by way of example that the ink jet printer 1 includes four head units 3 corresponding one to one to the four ink cartridges 120. Each ejector D[m] is supplied with ink from the ink cartridge 120 corresponding to the head unit 3 in which the ejector D[m] is provided. Thereby, each ejector D[m] may be filled with the supplied ink and may eject the ink from the nozzle N. The ink cartridge 120 may be provided outside the carriage 110. The nozzle N will be described later with reference to FIG. 3.

Additionally, as described above, the ink jet printer 1 according to the present embodiment includes the transport unit 7. As illustrated in FIG. 2, the transport unit 7 includes a carriage transport mechanism 71 for reciprocating the carriage 110 in the Y-axis direction, a carriage guide shaft 76 supporting the carriage 110 reciprocatingly in the Y-axis direction, a medium transport mechanism 73 for transporting the recording paper P, and a platen 75 provided on the +Z side of the carriage 110. Therefore, when the printing process is performed, the transport unit 7 changes the relative position of the recording paper P with respect to the head unit 3 by reciprocating the head unit 3 together with the carriage 110 along the carriage guide shaft 76 in the Y-axis direction by using the carriage transport mechanism 71 and transporting the recording paper P on the platen 75 in the +X direction by using the medium transport mechanism 73. This enables ink to land on the entire recording paper P.

Figure 3:
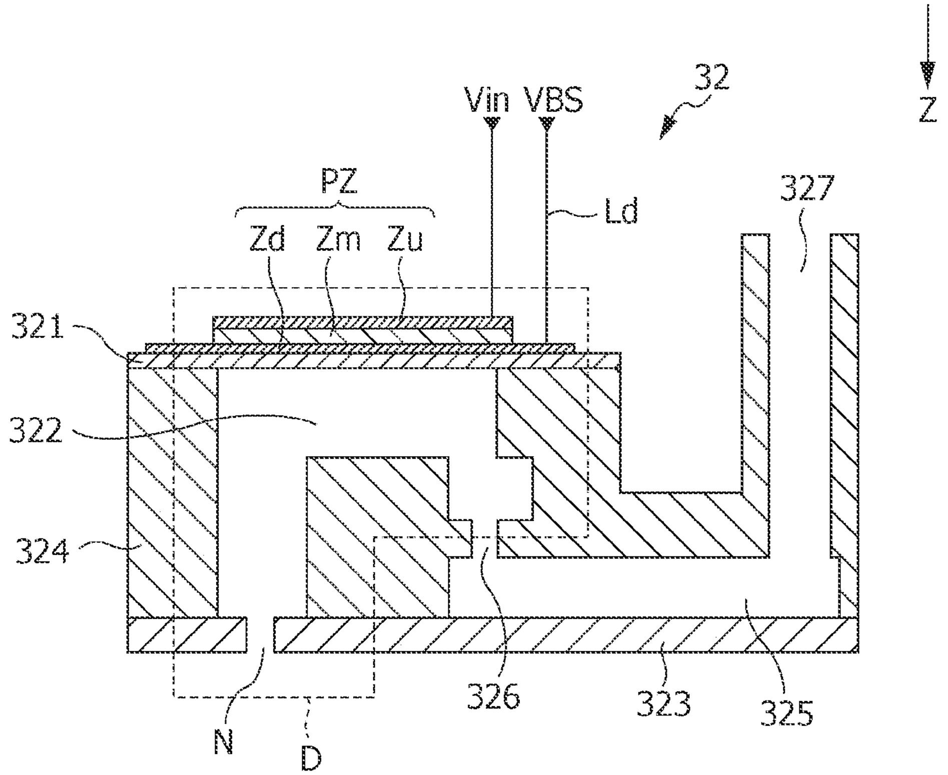
FIG. 3 is a sectional view illustrating an example of a structure of an ejector.

FIG. 3 is a schematic sectional view through a part of the recording head 32 in which the recording head 32 includes the ejector D[m].

As illustrated in FIG. 3, the ejector D[m] includes the piezoelectric element PZ[m], a cavity 322 filled with ink, the nozzle N communicating with the cavity 322, and a vibrating plate 321. The ejector D[m] ejects ink in the cavity 322 from the nozzle N in response to the piezoelectric element PZ[m] being driven by the supply driving signal Vin[m]. The cavity 322 is a space partitioned by a cavity plate 324, a nozzle plate 323 in which the nozzle N is formed, and a vibrating plate 321. The cavity 322 communicates with a reservoir 325 via an ink supply port 326. The reservoir 325 communicates through an ink intake port 327 with the ink cartridge 120 corresponding to the ejector D[m]. The piezoelectric element PZ[m] includes the upper electrode Zu[m], a lower electrode Zd[m], and a piezoelectric substance Zm[m] provided between the upper electrode Zu[m] and the lower electrode Zd[m]. The lower electrode Zd[m] is electrically coupled to an electric supply line Ld set at a potential VBS. When the supply driving signal Vin[m] is supplied to the upper electrode Zu[m] and thus a voltage is applied between the upper electrode Zu[m] and the lower electrode Zd[m], the piezoelectric element PZ[m] is displaced in the +Z direction or the −Z direction in accordance with the applied voltage and, as a result, the piezoelectric element PZ[m] vibrates. The lower electrode Zd[m] is bonded to the vibrating plate 321. Therefore, when the piezoelectric element PZ[m] vibrates by being driven by the supply driving signal Vin[m], the vibrating plate 321 also vibrates. The vibration of the vibrating plate 321 changes the volume of the cavity 322 and the pressure inside the cavity 322, which causes ink filled in the cavity 322 to be ejected from the nozzle N.

Figure 4:
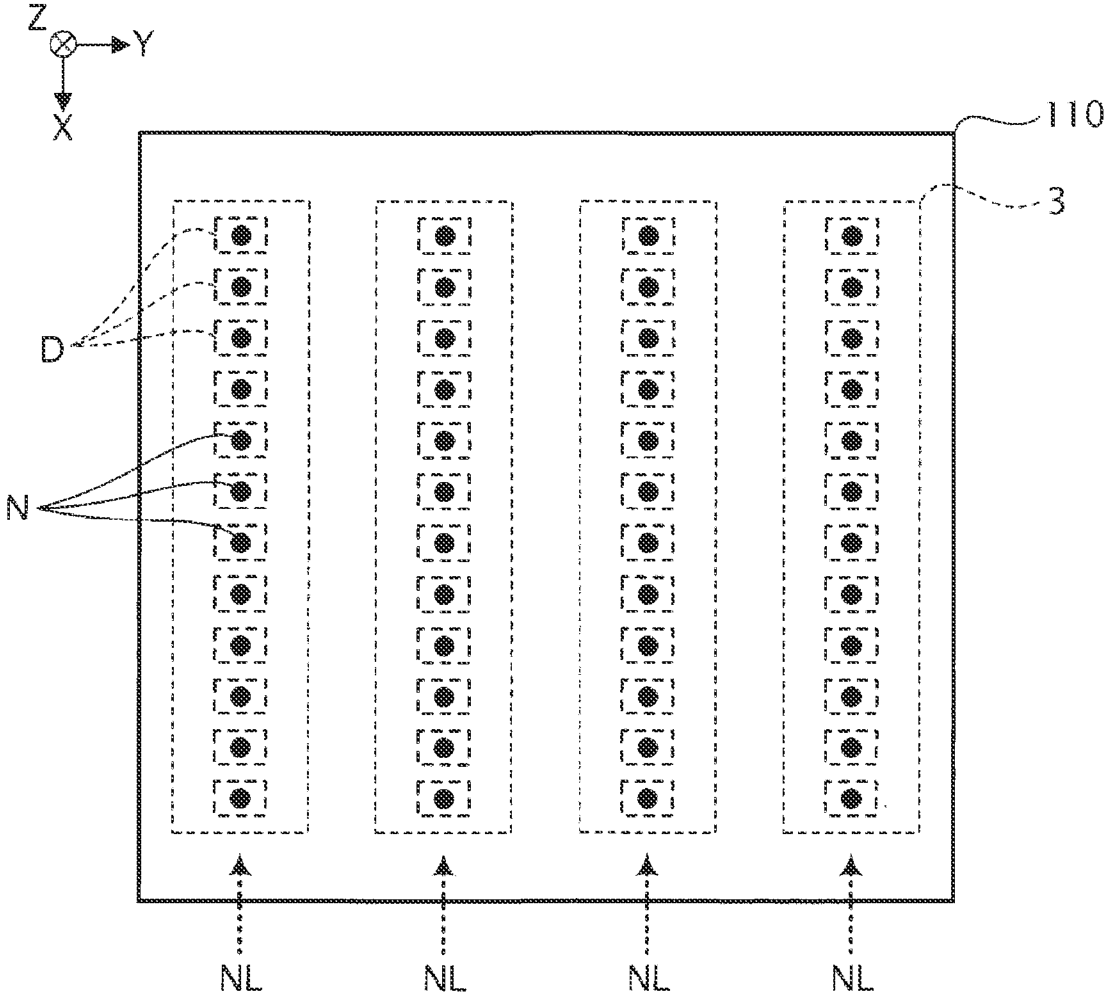
FIG. 4 is a plan view illustrating an example of arrangement of nozzles in a head unit.

FIG. 4 is an illustrative diagram illustrating an example of arrangement of four head units 3 mounted on the carriage 110 and a total of 4M nozzles N provided in the four head units 3, when the ink jet printer 1 is viewed in plan view from the +Z side.

As illustrated in FIG. 4, each of the head units 3 provided on the carriage 110 is provided with a nozzle line NL. The nozzle line NL is a plurality of nozzles N provided to extend in a line in a predetermined direction. In the present embodiment, it is assumed by way of example that each nozzle line NL consists of M nozzles N arranged to extend in the X-axis direction.

2. Configuration of Head Unit

Figure 5:
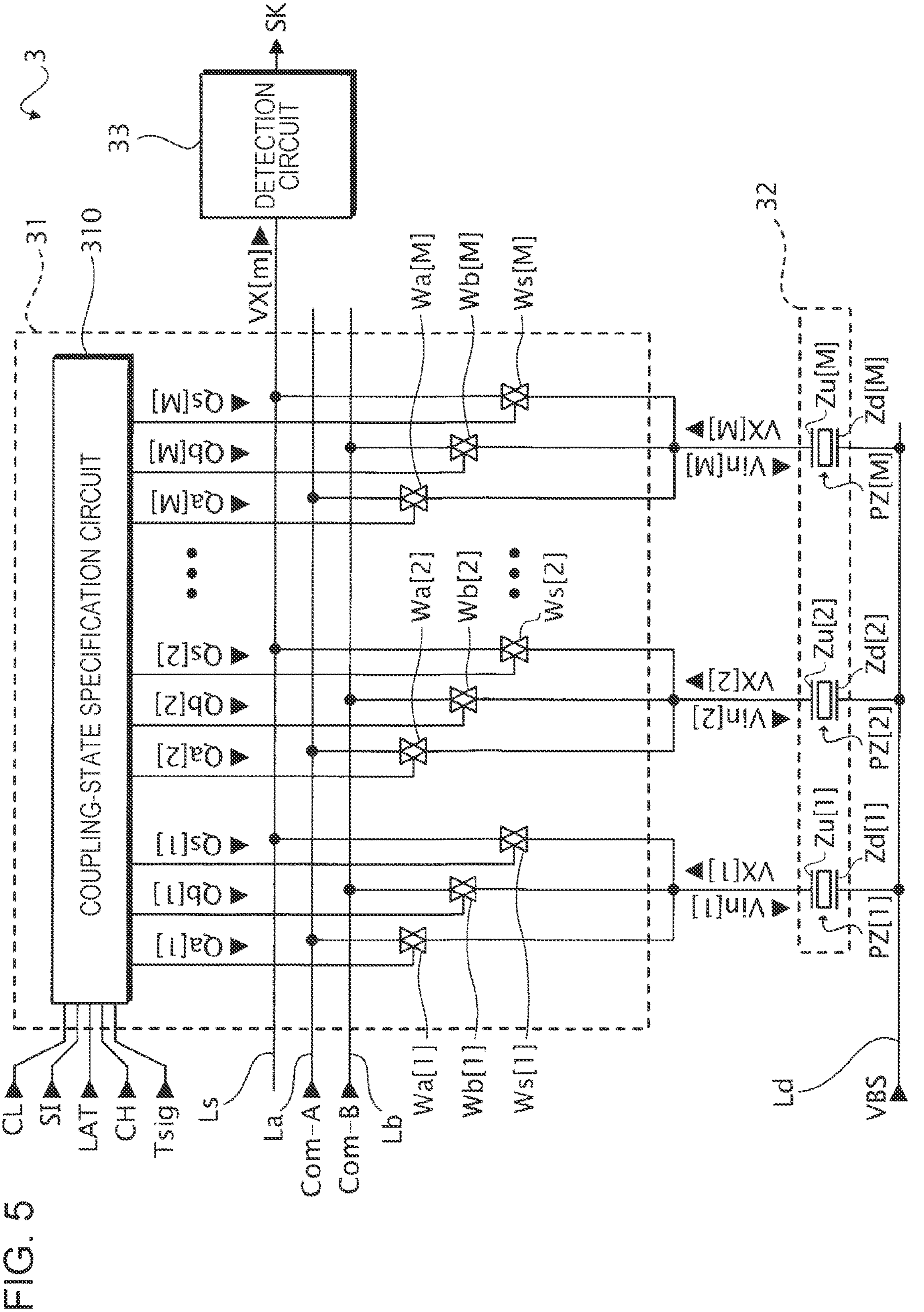
FIG. 5 is a block diagram illustrating an example of a configuration of the head unit.

With reference to FIG. 5, the configuration of the head unit 3 will be described below.

FIG. 5 is a block diagram illustrating an example of the configuration of the head unit 3.

As illustrated in FIG. 5, the head unit 3 includes a supply circuit 31, a recording head 32, and a detection circuit 33. The head unit 3 also includes a wire La through which the driving signal Com-A is supplied from the driving signal generation unit 4, a wire Lb through which the driving signal Com-B is supplied from the driving signal generation unit 4, and a wire Ls for supplying the detection potential signal VX[m] to the detection circuit 33.

As illustrated in FIG. 5, the supply circuit 31 includes M switches Wa[1] to Wa[M] corresponding one to one to the M ejectors D[1] to D[M], M switches Wb[1] to Wb[M] corresponding one to one to the M ejectors D[1] to D[M], M switches Ws[1] to Ws[M] corresponding one to one to the M ejectors D[1] to D[M], and a coupling-state specification circuit 310 that specifies the coupling state of each of the switches.

Among these components, the coupling-state specification circuit 310 generates a coupling-state specification signal Qa[m] specifying whether the switch Wa[m] is to be on or off, a coupling-state specification signal Qb[m] specifying whether the switch Wb[m] is to be on or off, and a coupling-state specification signal Qs[m] specifying whether the switch Ws[m] is to be on or off, based on at least some of the print signal SI, a latch signal LAT, a period specification signal Tsig, and a change signal CH supplied from the control unit 2.

In accordance with the coupling-state specification signal Qa[m], the switch Wa[m] switches between a conducting and a nonconducting state between the wire La and the upper electrode Zu[m] of the piezoelectric element PZ[m] provided in the ejector D[m]. In the present embodiment, the switch Wa[m] is on when the coupling-state specification signal Qa[m] is high and is off when this signal is low. When the switch Wa[m] is on, the driving signal Com-A supplied to the wire La is supplied as the supply driving signal Vin[m] to the upper electrode Zu[m] of the ejector D[m].

Additionally, in accordance with the coupling-state specification signal Qb[m], the switch Wb[m] switches between a conducting and a nonconducting state between the wire Lb and the upper electrode Zu[m] of the piezoelectric element PZ[m] provided in the ejector D[m]. In the present embodiment, the switch Wb[m] is on when the coupling-state specification signal Qb[m] is high and is off when this signal is low. When the switch Wb[m] is on, the driving signal Com-B supplied to the wire Lb is supplied as the supply driving signal Vin[m] to the upper electrode Zu[m] of the ejector D[m].

Additionally, in accordance with the coupling-state specification signal Qs[m], the switch Ws[m] switches between a conducting and a nonconducting state between the wire Ls and the upper electrode Zu[m] of the piezoelectric element PZ[m] provided in the ejector D[m]. In the present embodiment, the switch Ws[m] is on when the coupling-state specification signal Qs[m] is high and is off when this signal is low. When the switch Ws[m] is on, the potential of the upper electrode Zu[m] of the ejector D[m] is supplied as the detection potential signal VX[m] to the detection circuit 33 via the wire Ls.

Additionally, the detection circuit 33 generates, based on the detection potential signal VX[m] supplied from the wire Ls, the detection signal SK[m] having a waveform in accordance with the waveform of the detection potential signal VX[m].

3. Operations of Head Unit

Figure 6:
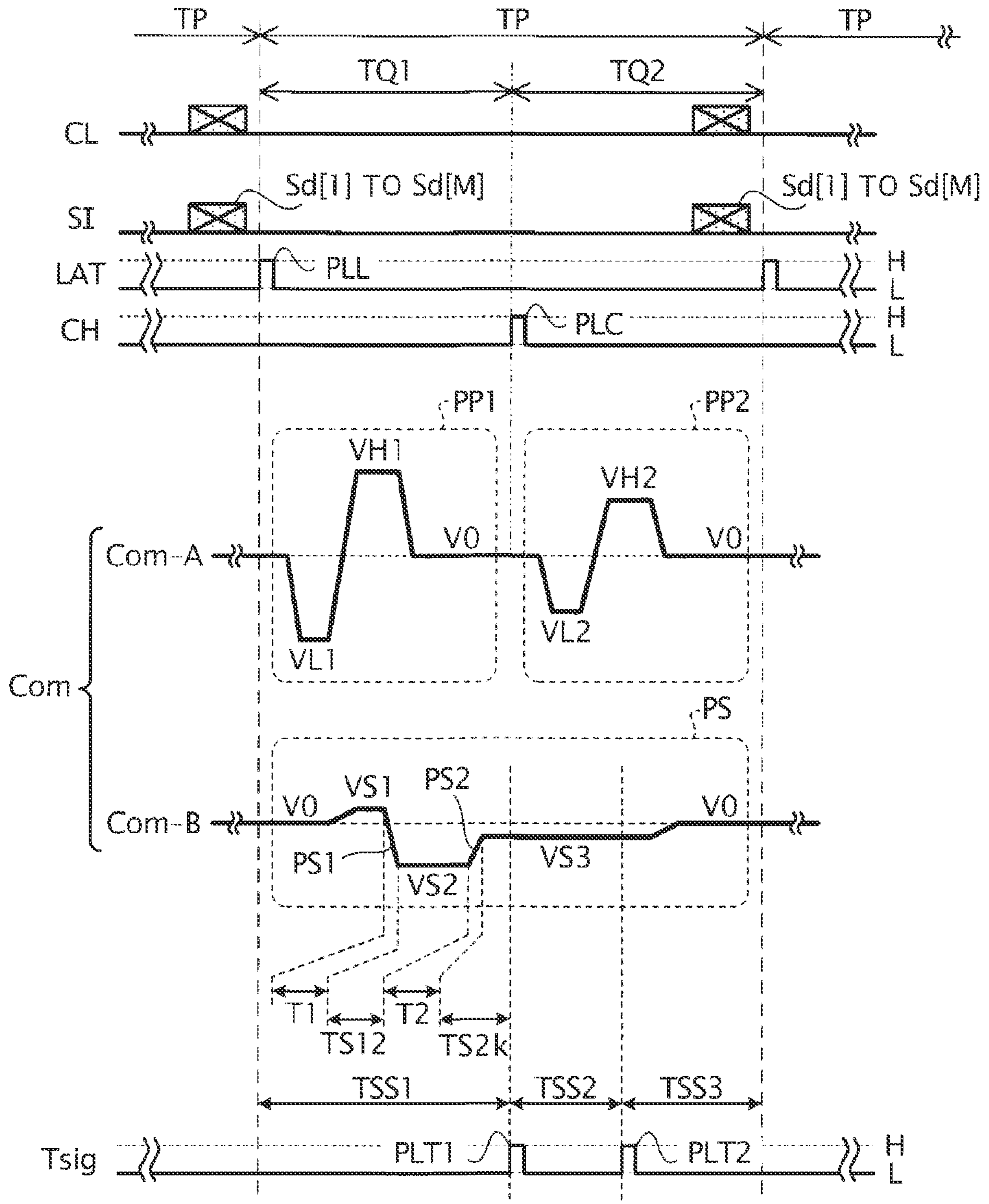
FIG. 6 is a timing chart illustrating an example of operations of the ink jet printer.

With reference to FIGS. 6 and 7, operations of the head unit 3 will be described below.

In the present embodiment, when the ink jet printer 1 performs the printing process or the ejection-state determination process, one or more unit periods TP are set as operation periods of the ink jet printer 1. In each of the unit periods TP, the ink jet printer 1 according to the present embodiment may drive each ejector D[m] for the printing process or the ejection-state determination process.

FIG. 6 is a timing chart for illustrating operations of the ink jet printer 1 in the unit period TP.

As illustrated in FIG. 6, the control unit 2 outputs the latch signal LAT having a pulse PLL. Thus, the control unit 2 defines the unit period TP as a period from the rise of the pulse PLL to the rise of the next pulse PLL.

The control unit 2 also outputs the change signal CH having a pulse PLC in the unit period TP. The control unit 2 divides the unit period TP into a control period TQ1 from the rise of the pulse PLL to the rise of the pulse PLC and a control period TQ2 from the rise of the pulse PLC to the rise of the pulse PLL.

The control unit 2 also outputs the period specification signal Tsig having a pulse PLT1 and a pulse PLT2 in the unit period TP. The control unit 2 divides the unit period TP into a control period TSS1 from the rise of the pulse PLL to the rise of the pulse PLT1, a control period TSS2 from the rise of the pulse PLT1 to the rise of the pulse PLT2, and a control period TSS3 from the rise of the pulse PLT2 to the rise of the pulse PLL.

The print signal SI according to the present embodiment includes M individual specification signals Sd[1] to Sd[M] corresponding one to one to the M ejectors D[1] to D[M]. The individual specification signal Sd[m] specifies how the ejector D[m] is driven in each unit period TP when the ink jet printer 1 performs the printing process or the ejection-state determination process.

As illustrated in FIG. 6, prior to each unit period TP, the control unit 2 supplies the print signal SI including the individual specification signals Sd[1] to Sd[M] in synchronization with a clock signal CL to the coupling-state specification circuit 310. In the unit period TP, the coupling-state specification circuit 310 generates the coupling-state specification signal Qa[m], the coupling-state specification signal Qb[m], and the coupling-state specification signal Qs[m] based on the individual specification signal Sd[m].

In the present embodiment, it is assumed that, in the printing unit period TP, the ejector D[m] may form any of a large dot, a medium dot smaller than the large dot, and a small dot smaller than the medium dot. In the present embodiment, it is also assumed that, in the printing unit period TP, the individual specification signal Sd[m] may take any one of five values, that is, a value of 1 that specifies the ejector D[m] as a large-dot formation ejector DP-1, which is the non-determination-target ejector DP that ejects ink in an amount corresponding to that of the large dot, a value of 2 that specifies the ejector D[m] as a medium-dot formation ejector DP-2, which is the non-determination-target ejector DP that ejects ink in an amount corresponding to that of the medium dot, a value of 3 that specifies the ejector D[m] as a small-dot formation ejector DP-3, which is the non-determination-target ejector DP that ejects ink in an amount corresponding to that of the small dot, a value of 4 that specifies the ejector D[m] as a non-dot formation ejector DP-4, which is the non-determination-target ejector DP that ejects no ink, and a value of 5 that specifies the ejector D[m] as the determination target ejector DS.

As illustrated in FIG. 6, in the present embodiment, the driving signal Com-A has a waveform PP1 provided in the control period TQ1 and a waveform PP2 provided in the control period TQ2. Of the two waveforms, the waveform PP1 is a waveform indicating that the potential changes from a reference potential VO through a potential VL1 lower than the reference potential VO and a potential VH1 higher than the reference potential VO and returns to the reference potential VO. In the case where the supply driving signal Vin[m] having the waveform PP1 is supplied to the ejector D[m], the waveform PP1 is set such that ink in an amount corresponding to an ink amount 1 is ejected from the ejector D[m]. The waveform PP2 is a waveform indicating that the potential changes from the reference potential VO through a potential VL2 lower than the reference potential VO and a potential VH2 higher than the reference potential VO and returns to the reference potential VO. In the case where the supply driving signal Vin[m] having the waveform PP2 is supplied to the ejector D[m], the waveform PP2 is set such that ink in an amount corresponding to an ink amount 2 is ejected from the ejector D[m].

In the present embodiment, the ink amount 1 is the amount of ink equivalent to that used to form the medium dot. Additionally, in the present embodiment, the ink amount 2, which is smaller than the ink amount E1, is the amount of ink equivalent to that used to form the small dot. Additionally, in the present embodiment, the sum of the ink amount 1 and the ink amount 2 is equivalent to the amount of ink used to form the large dot.

In the present embodiment, it is assumed by way of example that when the potential of the supply driving signal Vin[m] supplied to the ejector D[m] is a high potential, the volume of the cavity 322 in the ejector D[m] is smaller than that in the low potential case. Therefore, when the ejector D[m] is driven by the supply driving signal Vin[m] having the waveform PP1 or the waveform PP2, the potential of the supply driving signal Vin[m] changes from low to high to eject ink in the ejector D[m] from the nozzle N.

As illustrated in FIG. 6, in the present embodiment, the driving signal Com-B has a waveform PS in the unit period TP. The waveform PS is a waveform indicating that the potential changes from the reference potential VO through a potential VS1 and a potential VS2 to a potential VS3 in the control period TSS1, is kept at the potential VS3 during the control period TSS2, and changes from the potential VS3 to the reference potential VO in the control period TSS3.

In the present embodiment, the potential VS1 is a potential higher than the reference potential VO. However, the potential VS1 may be the same potential as the reference potential VO. In the present embodiment, the potential VS2 is a potential lower than the reference potential VO. However, the potential VS2 may be a potential lower than the potential VS1. In the present embodiment, the potential VS3 is a potential lower than the reference potential VO and higher than the potential VS2. However, the potential VS3 may be a potential higher than the potential VS2.

Hereinbelow, a portion of the waveform PS where the potential changes from the potential VS1 to the potential VS2 will be referred to as a waveform PS1, and a portion of the waveform PS where the potential changes from the potential VS2 to the potential VS3 will be referred to as a waveform PS2. In the present embodiment, the waveform PS1 is a waveform for displacing the piezoelectric element PZ[m] in the −Z direction, and the waveform PS2 is a waveform for displacing the piezoelectric element PZ[m] in the +Z direction.

Hereinbelow, additionally, a time period of the control period TSS1 during which the waveform PS1 is provided will be referred to as a time period T1 and a time period of the control period TSS1 during which the waveform PS2 is provided will be referred to as a time period T2; a time period from completion of the time period T1 to the start of the time period T2 will be referred to as a time period TS12, and a time period from completion of the time period T2 to the start of the control period TSS2 will be referred to as a time period TS2K.

Figure 8:
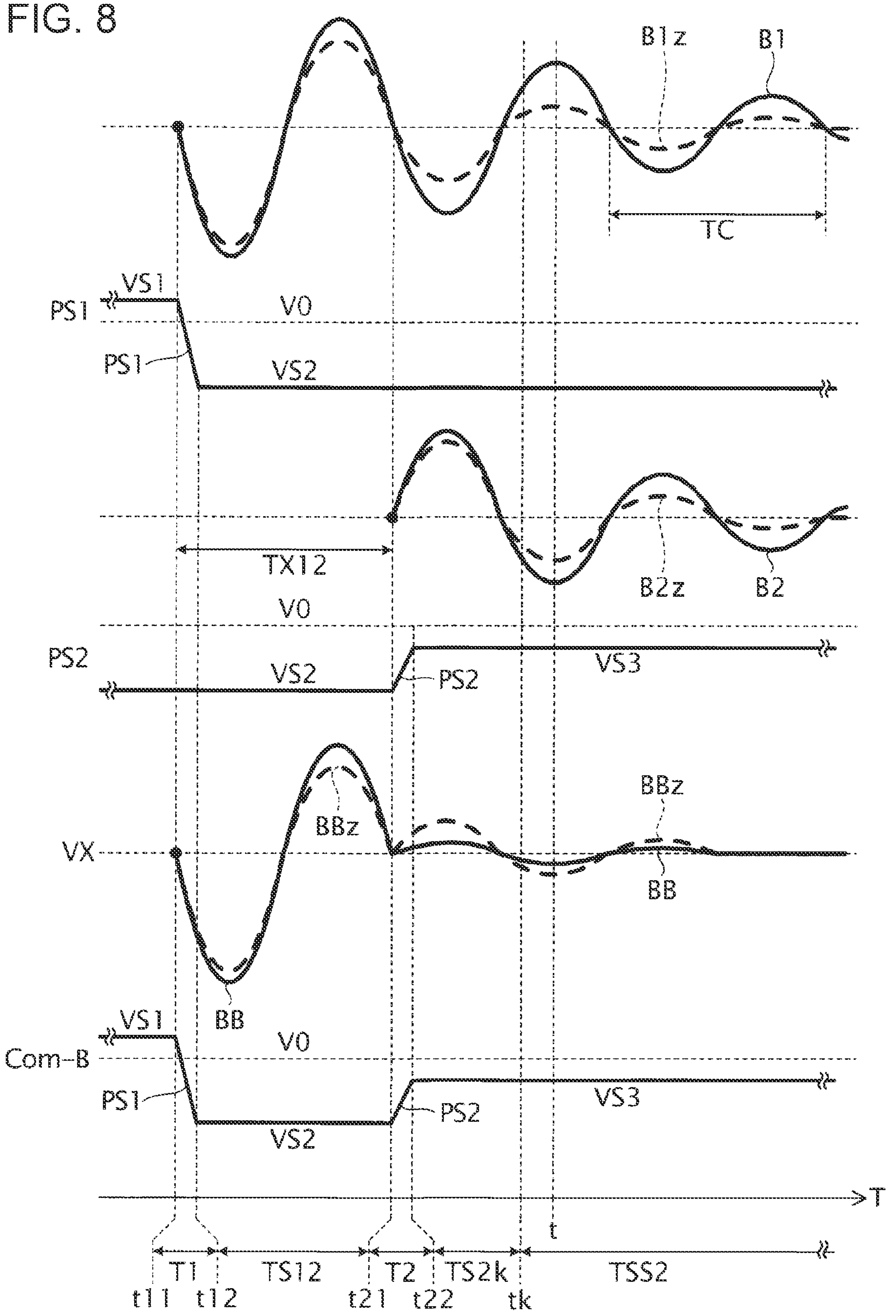
FIG. 8 is a timing chart illustrating an example of a relation between vibrations produced in the ejector and a driving signal.

Additionally, as illustrated in FIG. 8 described later, the time point at which the time period T1 starts will be referred to as a time point t11, the time point at which the time period T1 ends will be referred to as a time point t12, the time point at which the time period T2 starts will be referred to as a time point t21, the time point at which the time period T2 ends will be referred to as a time point t22, and the time point at which the control period TSS2 starts will be referred to as a time point tk.

In the present embodiment, it is assumed by way of example that the waveform PS is set such that ink is not ejected from the ejector D[m] when the supply driving signal Vin[m] having the waveform PS is supplied to the ejector D[m].

FIG. 7 is a table illustrating the relation among the individual specification signal Sd[m], the coupling-state specification signal Qa[m], the coupling-state specification signal Qb[m], and the coupling-state specification signal Qs[m] in the unit period TP.

As illustrated in FIG. 7, when the individual specification signal Sd[m] indicates a value of 1, which specifies the ejector D[m] as the large-dot formation ejector DP−1 during the unit period TP, the coupling-state specification circuit 310 sets the coupling-state specification signal Qa[m] high over the control period TQ1 and the control period TQ2. In this case, the switch Wa[m] remains on over the unit period TP. Therefore, in the unit period TP, the ejector D[m] is driven by the supply driving signal Vin[m] having the waveform PP1 and the waveform PP2 to eject ink in an amount equivalent to that of the large dot.

When the individual specification signal Sd[m] indicates a value of 2, which specifies the ejector D[m] as the medium-dot formation ejector DP−2 during the unit period TP, the coupling-state specification circuit 310 sets the coupling-state specification signal Qa[m] high during the control period TQ1. In this case, the switch Wa[m] is on during the control period TQ1. Therefore, in the unit period TP, the ejector D[m] is driven by the supply driving signal Vin[m] having the waveform PP1 to eject ink in an amount equivalent to that of the medium dot.

When the individual specification signal Sd[m] indicates a value of 3, which specifies the ejector D[m] as the small-dot formation ejector DP−3 during the unit period TP, the coupling-state specification circuit 310 sets the coupling-state specification signal Qa[m] high during the control period TQ2. In this case, the switch Wa[m] is on during the control period TQ2. Therefore, in the unit period TP, the ejector D[m] is driven by the supply driving signal Vin[m] having the waveform PP2 to eject ink in an amount equivalent to that of the small dot.

When the individual specification signal Sd[m] indicates a value of 4, which specifies the ejector D[m] as the non-dot formation ejector DP−4 during the unit period TP, the coupling-state specification circuit 310 sets the coupling-state specification signal Qa[m], the coupling-state specification signal Qb[m], and the coupling-state specification signal Qs[m] low over the unit period TP. In this case, the switch Wa[m], the switch Wb[m], and the switch Ws[m] remain off over the unit period TP. Therefore, the supply driving signal Vin[m] is not supplied to the ejector D[m] in the unit period TP, and therefore no ink is ejected from the ejector D[m].

When the individual specification signal Sd[m] indicates a value of 5, which specifies the ejector D[m] as the determination target ejector DS during the unit period TP, the coupling-state specification circuit 310 sets the coupling-state specification signal Qb[m] high during the control period TSS1 and the control period TSS3 and sets the coupling-state specification signal Qs[m] high during the control period TSS2. In this case, the switch Wb[m] is on during the control period TSS1 and the control period TSS3 and the switch Ws[m] is on during the control period TSS2. Therefore, when, in the control period TSS1, the ejector D[m] specified as the determination target ejector DS is driven by the supply driving signal Vin[m] having the waveform PS1 and the waveform PS2 and, as a result, vibrations are produced in the ejector D[m], the vibrations remain in the control period TSS2. When, in the control period TSS2, vibrations remain in the ejector D[m], the potential of the upper electrode Zu[m] in the ejector D[m] changes. When, in the control period TSS2, vibrations remain in the ejector D[m], the potential of the upper electrode Zu[m] is supplied as the detection potential signal VX[m] to the detection circuit 33 via the switch Ws[m].

That is, the waveform of the detection potential signal VX[m] detected from the ejector D[m] in the control period TSS2 represents the waveform of vibrations remaining in the ejector D[m] in the control period TSS2. The waveform of the detection signal SK[m] generated based on the detection potential signal VX[m] detected from the ejector D[m] in the control period TSS2 represents the waveform of vibrations remaining in the ejector D[m] in the control period TSS2.

4. Relation Between Vibrations Remaining in Ejector and Driving Signal

With reference to FIG. 8, the relation between the driving signal Com and vibrations remaining in the ejector D will be described below.

In the present embodiment, the detection potential signal VX detected from the determination target ejector DS by the detection circuit 33 indicates a vibration BB, which is a composite vibration of a vibration B1 produced due to the waveform PS1 and a vibration B2 produced due to the waveform PS2, as illustrated in FIG. 8. In the present embodiment, a period TC of the vibration BB, the vibration B1, and the vibration B2 is the natural vibration period of the determination target ejector DS.

In the present embodiment, the control unit 2 controls the driving signal generation unit 4 so as to generate the driving signal Com with which the vibration B1 and the vibration B2 cancel each other. Specifically, in the present embodiment, the waveform PS of the driving signal Com is set such that a duration TXl2 from the time point t11 at which the time period T1, during which the waveform PS1 for producing the vibration B1 is provided, starts to the time point t21 at which the time period T2, during which the waveform PS2 for producing the vibration B2 is provided, starts is a natural number times the period TC.

In the present embodiment, when the ejection state of ink in the determination target ejector DS is normal, a waveform e1 of the vibration B1 at a time point t in the control period TSS2 is expressed by the following equation (1):

$$e1=E1\cdot\sin\{\omega t+\theta 1\} \tag{1}$$

In equation (1), the value E1 is the amplitude of the vibration B1 at the time point t. The value w is a value set based on the acoustic resistance in the ejector D, the weight of ink in the ejector D, and the compliance of the ejector D. The value θ1 is a value set based on the time interval between the time point t11 and the time point t.

In the present embodiment, when the ejection state of ink in the determination target ejector DS is normal, a waveform e2 of the vibration B2 at the time point t is expressed by the following equation (2):

$$e2=E2\cdot\sin\{\omega t+\theta 2\} \tag{2}$$

In equation (2), the value E2 is the amplitude of the vibration B2 at the time point t. The value θ2 is a value set based on the time interval between the time point t21 and the time point t and satisfies the following equation (3):

$$\theta 2=\theta 1+(2k-1)\pi \tag{3}$$

where the value k is a natural number greater than or equal to 1.

In the present embodiment, the control unit 2 controls the driving signal generation unit 4 so that the driving signal generation unit 4 generates the driving signal Com with which an amplitude E1 and an amplitude E2 are approximately equal when the ejection state of ink in the determination target ejector DS is normal. The meaning of "approximately equal" used herein includes, in addition to the case where both objects are completely equal, a case where both objects are regarded as being equal when an error is taken into account. Therefore, in the present embodiment, when the ejection state of ink in the determination target ejector DS is normal, a waveform eb of the vibration BB at the time point t is expressed by the following equation (4):

$$eb=e1+e2=(E1-E2)\cdot\sin\{\omega t+\theta 1\}\approx 0 \tag{4}$$

In the present embodiment, when the viscosity of ink in the determination target ejector DS is increased and an ejection abnormality has occurred in the determination target ejector DS, the detection potential signal VX detected from the determination target ejector DS by the detection circuit 33 indicates a vibration BBz, which is a composite vibration of a vibration B1$z$ produced due to the waveform PS1 and a vibration B2$z$ produced due to the waveform PS2, as illustrated in FIG. 8.

In the present embodiment, a waveform e1$z$ of a vibration B1$z$ at the time point t in the control period TSS2 is expressed by the following equation (5):

$$e1z=E1z\cdot\sin\{\omega t+\theta 1\} \tag{5}$$

where the value E1$z$ is the amplitude of the vibration B1$z$ at the time point t. The amplitude E1$z$ is smaller than the amplitude E1.

In the present embodiment, a waveform e2$z$ of the vibration B2$z$ at the time point t in the control period TSS2 is expressed by the following equation (6):

$$e2z=E2z\cdot\sin\{\omega t+\theta 2\} \tag{6}$$

where the value E2$z$ is the amplitude of the vibration B2$z$ at the time point t. The amplitude E2$z$ is smaller than the amplitude E2.

In the present embodiment, a waveform ebz of the vibration BBz at the time point t is expressed by the following equation (7):

$$ebz=e1z+e2z=(E1z-E2z)\cdot\sin\{\omega t+\theta 1\} \tag{7}$$

When the viscosity of ink in the determination target ejector DS is increased and an ejection abnormality has occurred in the determination target ejector DS, the damping rate of vibrations produced in the determination target ejector DS is higher than that when the viscosity of ink is not increased. The time interval between the time point t11 and the time point t is longer than the time interval between the time point t21 and the time point t. Therefore, in the present embodiment, the degree of damping of vibrations in the determination target ejector DS in the time period from the time point t11 to the time point t is larger than the degree of damping of vibrations in the determination target ejector DS in the time period from the time point t21 to the time point t. Accordingly, in the present embodiment, even when "E1≈E2" holds between the amplitude E1 and the amplitude E2, the relation "E1$z$<E2$z$" holds between the amplitude E1$z$ and the amplitude E2$z$. That is, the amplitude of the vibration BBz is larger than the amplitude of the vibration BB.

In the present embodiment, the determination unit 8 determines, based on the detection signal SK, whether the largest value of the amplitude of the detection potential signal VX is greater than or equal to a predetermined reference amplitude. When the largest value of the amplitude of the detection potential signal VX is less than the predetermined reference amplitude, the determination unit 8 regards that the vibration BB has occurred in the determination target ejector DS, determines that the ejection state of ink in the determination target ejector DS is normal, and generates an ejection state determination information JH indicating a result of the determination. In contrast, when the largest value of the amplitude of the detection potential signal VX is less than or equal to the predetermined reference amplitude, the determination unit 8 regards that the vibration BBz has occurred in the determination target ejector DS, determines that an ejection abnormality due to an increase in viscosity has occurred in the determination target ejector DS, and generates the ejection state determination information JH indicating a result of the determination.

In the present embodiment, the waveform PS of the driving signal Com is set such that the duration TX12 is a natural number times the period TC, but the present disclosure is not limited to such. For example, the duration TX12 may be determined to satisfy the following equation (8):

$$k \cdot TC - \frac{TC}{4} < TX12 < k \cdot TC + \frac{TC}{4} \quad (8)$$

Additionally, in the present embodiment, the value θ1 and the value θ2 are determined to satisfy equation (3) described above, but the present disclosure is not limited to such. For example, the value θ1 and the value θ2 may be determined to satisfy the following equation (9):

$$(2k-1)\pi - \frac{\pi}{2} < \theta 2 - \theta 1 < (2k-1)\pi + \frac{\pi}{2} \quad (9)$$

5. Reference Example

Figure 9:
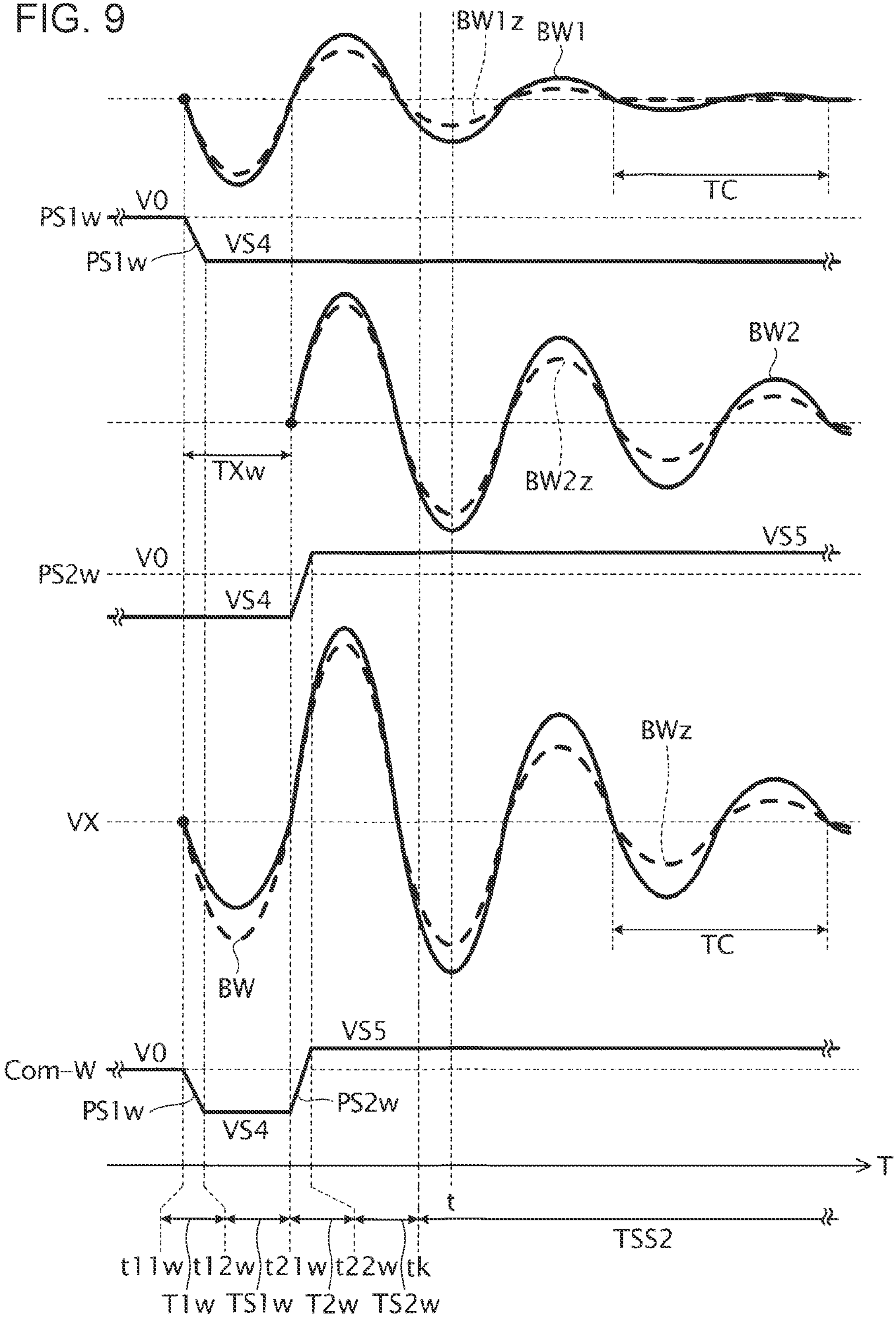
FIG. 9 is a timing chart illustrating an example of a relation between vibrations produced in the ejector and a driving signal according to a reference example.

With reference to FIG. 9, the driving signal Com according to a reference example will be described below.

The driving signal Com according to the reference example differs from the driving signal Com according to the embodiment in that the driving signal Com according to the reference example includes the driving signal Com-W instead of the driving signal Com-B.

As illustrated in FIG. 9, the driving signal Com-W has a waveform indicating a potential that changes from the reference potential VO through a potential VS4 lower than the reference potential VO to a potential VS5 higher than the reference potential VO in the control period TSS1, is kept at the potential VS5 during the control period TSS2, and changes from the potential VS5 to the reference potential VO in the control period TSS3.

Specifically, the driving signal Com-W has a waveform PS1*w* indicating that the potential changes from the reference potential VO to the potential VS4 in a time period T1*w* starting at a time point t11*w* and ending at a time point tl2*w* of the control period TSS1, and has a waveform PS2*w* indicating that the potential is kept at the potential VS4 during a time period TS1*w* starting at the time point t12*w* and ending at a time point t21*w* of the control period TSS1 and changes from the potential VS4 to a potential VS5 in a time period T2*w* starting at the time point t21*w* and ending at a time point t22*w* of the control period TSS1. The potential of the driving signal Com-W is kept at the potential VS5 during a period TS2*w* starting at the time point t22*w* and ending at a time point tk of the control period TSS1.

In the reference example, as in the embodiment, the supply driving signal Vin including the driving signal Com-W is supplied to the determination target ejector DS in the control period TSS1 and the control period TSS3, and the supply of the driving signal Com is stopped during the control period TSS2. In the reference example, as in the embodiment, the detection potential signal VX indicating the potential of the upper electrode Zu is supplied from the determination target ejector DS to the detection circuit 33 in the control period TSS2.

For example, in the reference example, a duration TXw from the time point t11*w* to the time point t21*w* may be determined to satisfy the following equation (10):

$$TXw = (2k-1)\frac{TC}{2} \quad (10)$$

In the reference example, when the ejection state of ink in the determination target ejector DS is normal, the detection potential signal VX detected from the determination target ejector DS by the detection circuit 33 indicates a vibration BW, which is a composite vibration of a vibration BW1 produced due to the waveform PS1*w* and a vibration BW2 produced due to the waveform PS2*w*, as illustrated in FIG. 9. In the reference example, the driving signal Com-W is set such that the vibration BW is produced by the vibration BW1 and the vibration BW2 enhancing each other.

Specifically, in the control period TSS2, a waveform ew1 of the vibration BW1 at the time point t is expressed by the following equation (11), a waveform ew2 of the vibration BW2 at the time point t is expressed by the following equation (12), and a waveform ew of the vibration BW at the time point t is expressed by the following equation (13):

$$ew1 = EW1 \cdot \sin\{\omega t + \theta 1\} \quad (11)$$

$$ew2 = EW2 \cdot \sin\{\omega t + \theta 1\} \quad (12)$$

$$ew = (EW1 + EW2) \cdot \sin\{\omega t + \theta t\} \quad (13)$$

where, the amplitude EW1 is the amplitude of the vibration BW1 at the time point t and the amplitude EW2 is the amplitude of the vibration BW2 at the time point t.

In the reference example, when the viscosity of ink in the determination target ejector DS is increased and an ejection abnormality has occurred in the determination target ejector DS, the detection potential signal VX detected from the determination target ejector DS by the detection circuit 33 indicates a vibration BWz, which is a composite vibration of the vibration BW1*z* produced due to the waveform PS1*w* and a vibration BW2*z* produced due to the waveform PS2*w*, as illustrated in FIG. 9.

Specifically, in the control period TSS2, a waveform ew1*z* of the vibration BW1*z* at the time point t is expressed by the following equation (14), a waveform ew2*z* of the vibration BW2*z* at the time point t is expressed by the following equation (15), and a waveform ewz of the vibration BW at the time point t is expressed by the following equation (16):

$$ew1z = EW1z \cdot \sin\{\omega t + \theta 1\} \quad (14)$$

$$ew2z = EW2z \cdot \sin\{wt + \theta 1\} \quad (15)$$

$$ewz = (EW1z + EW2z) \cdot \sin\{\omega t + \theta 1\} \quad (16)$$

where the amplitude EWlz is the amplitude of the vibration BW1*z* at the time point t and the amplitude EW2*z* is the amplitude of the vibration BW2*z* at the time point t.

In the reference example, the determination unit 8 determines, based on the detection signal SK, which of the vibration BW and the vibration BWz the vibration produced in the determination target ejector DS corresponds to.

In such a manner, in the reference example, the amplitude of the vibration BW is larger than the amplitude of the BW1 and larger than the amplitude of the vibration BW2. In addition, in the reference example, the amplitude of the vibration BWz is larger than the amplitude of the BW1*z* and larger than the amplitude of the vibration BW2*z*. Therefore, according to the reference example, even when the vibration produced in the determination target ejector DS is fine, the detection potential signal VX may be reliably detected in the detection circuit 33.

However, in the reference example, the amount of change in the amplitude of the vibration BW when the viscosity of ink is increased in the determination target ejector DS, for example, the ratio of the amplitude of the vibration BWz to the amplitude of the vibration BW, is small. Therefore, when the degree at which the viscosity of ink in the determination target ejector DS is increased is small, the ejection state of ink in the determination target ejector DS may not be accurately determined.

In contrast, according to the present embodiment, when the viscosity of ink is increased in the determination target ejector DS, the amount of change in the amplitude of the vibration BB is larger than that in the reference example. Specifically, the amount of change in the amplitude of the vibration BB when the viscosity of ink is increased in the determination target ejector DS according to the present embodiment is larger than the amount of change in the amplitude of the vibration BW when the viscosity of ink is increased in the determination target ejector DS according to the reference example. More specifically, for example, the ratio of the amplitude of the vibration BBz to the amplitude of the vibration BB in the present embodiment is larger than the ratio of the amplitude of the vibration BWz to the amplitude of the vibration BW in the reference example. Therefore, according to the present embodiment, even when the degree at which the viscosity of ink in the determination target ejector DS is increased is small, the ejection state of ink in the determination target ejector DS may be more accurately determined with a higher sensitivity than in the reference example.

6. Conclusion of Embodiment

As described above, the ink jet printer 1 according to the present embodiment includes the ejector D[m] that ejects ink filled in the cavity 322 in accordance with displacement of the piezoelectric element PZ[m], the driving signal generation unit 4 that generates the driving signal Com, which has the waveform PS1 provided in the time period T1 starting at the time point t11 for displacing the piezoelectric element PZ[m] in the −Z direction and the waveform PS2 provided in the time period T2 starting at the time point t21 for displacing the piezoelectric element PZ[m] in the +Z direction, and the detection circuit 33 that detects a vibration remaining in the ejector D[m] in the control period TSS2 starting after completion of the time period T2. The difference between the duration TX12 from the time point t11 to the time point t21 and a natural number times the period TC of a vibration produced in the ejector D[m] is shorter than one quarter of the period TC. With the ink jet printer 1 according to the present embodiment, for example, the degree of difference between the amplitude of the vibration BB produced in the ejector D[m] when the viscosity of ink filled in the ejector D[m] is not increased and the amplitude of the vibration BBz produced in the ejector D[m] when the viscosity of ink filled in the ejector D[m] is increased may be larger than that in the reference example. Therefore, according to the present embodiment, for example, even when the degree at which the viscosity of ink in the ejector D[m] is increased is small, the ejection state of ink in the ejector D[m] may be determined more accurately than in the reference example.

In the present embodiment, the ink jet printer 1 is an example of "liquid ejecting apparatus", the cavity 322 is an example of "pressure chamber", the time point t11 is an example of "first time point", the time period T1 is an example of "first time period", the −Z direction is an example of "first direction", the waveform PS1 is an example of "first waveform", the time point t21 is an example of "second time point", the time period T2 is an example of "second time period", the +Z direction is an example of "second direction", the waveform PS2 is an example of "second waveform", the driving signal generation unit 4 is an example of "generator", the control period TSS2 is an example of "detection time period", and the detection circuit 33 is an example of "detector".

The ink jet printer 1 according to the present embodiment may include the determination unit 8 that determines, based on a vibration detected by the detection circuit 33 in the control period TSS2, whether there is an increase in the viscosity of ink filled in the cavity 322.

Therefore, the ink jet printer 1 according to the present embodiment may reduce a decrease in the printing quality along with an increase in the viscosity of ink.

In the present embodiment, the determination unit 8 is an example of "determiner".

In the ink jet printer 1 according to the present embodiment, the amplitude at the time point tk of the vibration B1 produced in the ejector D[m] due to the waveform PS1 may be approximately equal to the amplitude at the time point tk of the vibration B2 produced in the ejector D[m] due to the waveform PS2.

With the ink jet printer 1 according to the present embodiment, for example, the degree of difference between the amplitude of the vibration BB produced in the ejector D[m] when the viscosity of ink filled in the ejector D[m] is not increased and the amplitude of the vibration BBz produced in the ejector D[m] when the viscosity of ink filled in the ejector D[m] is increased may be larger than that in the reference example. Therefore, according to the present embodiment, for example, even when the degree at which the viscosity of ink in the ejector D[m] is increased is small, the ejection state of ink in the ejector D[m] may be determined more accurately than in the reference example.

In the present embodiment, the vibration B1 is an example of "first vibration" and the vibration B2 is an example of "second vibration".

In the ink jet printer 1 according to the present embodiment, when the amplitude of the vibration detected by the detection circuit 33 in the control period TSS2 is greater than or equal to a reference amplitude, the determination unit 8 may determine that there is an increase in the viscosity of ink filled in the cavity 322.

Therefore, the ink jet printer 1 according to the present embodiment may reduce a decrease in the printing quality along with an increase in the viscosity of ink.

As described above, the ink jet printer 1 according to the present embodiment includes the driving signal generation unit 4 that generates the driving signal Com, the ejector D[m] that ejects ink when supplied with the driving signal Com, and the detection circuit 33 that detects a vibration produced in the ejector D[m] driven by the driving signal Com. The driving signal generation unit 4 generates the driving signal Com-B having the waveform PS1 provided in the time period T1 starting at the time point t11 for producing the vibration B1 in the ejector D[m] and the waveform PS2 provided in the time period T2 starting at the time point t21 for producing the vibration B2 in the ejector D[m]. When the ejector D[m] is driven by the driving signal Com-B, the detection circuit 33 detects the composite vibration BB of the vibration B1 and the vibration B2 remaining in the ejector D[m] in the control period TSS2 starting after completion of the time period T2, and the difference between a phase difference between the vibration B1 and the vibration B2 and an odd multiple of π is smaller than a half of π.

With the ink jet printer 1 according to the present embodiment, for example, the degree of difference between the amplitude of the vibration BB produced in the ejector D[m] when the viscosity of ink filled in the ejector D[m] is not increased and the amplitude of the vibration BBz produced in the ejector D[m] when the viscosity of ink filled in the ejector D[m] is increased may be larger than that in the reference example. Therefore, according to the present embodiment, for example, even when the degree at which the viscosity of ink in the ejector D[m] is increased is small, the ejection state of ink in the ejector D[m] may be determined more accurately than in the reference example.

B. Modification Examples

Each form described above may be modified in a variety of ways. Aspects of specific modifications will be illustrated by way of example below. Two or more aspects selected arbitrarily from the illustrations given below may be combined as appropriate to the extent that they are not inconsistent with each other. In the modification examples illustrated by way of example below, elements with operations and functions similar to those in the embodiment are denoted by reference numerals borrowed from the description given above and detailed description of each of the elements is omitted as appropriate.

First Modification Example

In the present embodiment described above, the driving signal Com that is supplied to the determination target ejector DS has the waveform PS1 for displacing the piezoelectric element PZ[m] in the −Z direction and the waveform PS2 for displacing the piezoelectric element PZ[m] in the +Z direction. However, the present disclosure is not limited to such. The driving signal Com that is supplied to the determination target ejector DS may have the waveform PS1 for displacing the piezoelectric element PZ[m] in the +Z direction and the waveform PS2 for displacing the piezoelectric element PZ[m] in the +Z direction or may have the waveform PS1 for displacing the piezoelectric element PZ[m] in the −Z direction and the waveform PS2 for displacing the piezoelectric element PZ[m] in the −Z direction.

The driving signal Com according to the present modification example differs from the driving signal Com according to the embodiment in that the driving signal Com according to the present modification example includes the driving signal Com-C instead of the driving signal Com-B.

Figure 10:
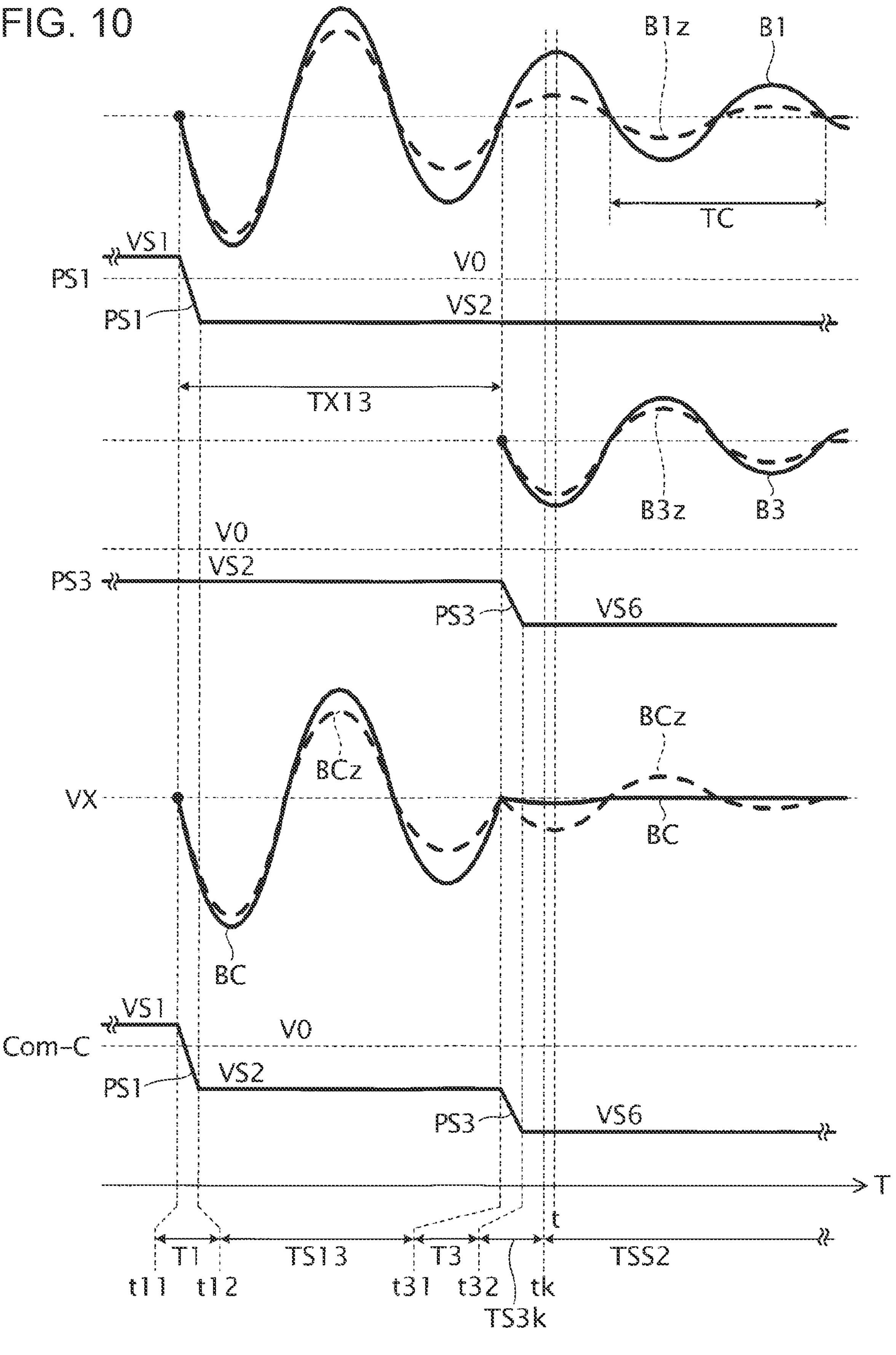
FIG. 10 is a timing chart illustrating an example of a relation between vibrations produced in the ejector and a driving signal according to a first modification example.

As illustrated in FIG. 10, the driving signal Com-C has a waveform indicating a potential that changes from the reference potential VO through the potential VS2 to a potential VS6 lower than the reference potential VS2 in the control period TSS1, is kept at the potential VS6 during the control period TSS2, and changes from the potential VS6 to the reference potential VO in the control period TSS3.

Specifically, in the driving signal Com-C, the waveform PS1 is provided in the time period T1 of the control period TSS1, the potential VS2 is maintained during a time period TS13 starting at the time point t12 and ending at a time point t31 of the control period TSS1, a waveform PS3 indicating a potential that changes from the potential VS2 to a potential VS6 in a time period T3 starting at the time point t31 and ending at a time point t32 of the control period TSS1, and the potential VS6 is maintained during a period TS3*k* starting at the time point t32 and ending at the time point tk of the control period TSS1.

In the present modification example, as in the embodiment, the supply driving signal Vin including the driving signal Com-C is supplied to the determination target ejector DS in the control period TSS1 and the control period TSS3, and the supply of the driving signal Com is stopped during the control period TSS2. In the present modification example, as in the embodiment, the detection potential signal VX indicating the potential of the upper electrode Zu is supplied from the determination target ejector DS to the detection circuit 33 in the control period TSS2.

In the present modification example, a duration TX13 from the time point t11 to the time point t31 may be determined to satisfy the following equation (17):

$$TX13=(2k-1)\frac{TC}{2} \tag{17}$$

In the present modification example, when the ejection state of ink in the determination target ejector DS is normal, the detection potential signal VX detected from the determination target ejector DS by the detection circuit 33 indicates a vibration BC, which is a composite vibration of the vibration B1 produced due to the waveform PS1 and a vibration B3 produced due to the waveform PS3, as illustrated in FIG. 10. In the present modification example, the driving signal Com-C is set such that the vibration B1 and the vibration B3 cancel each other.

Specifically, a waveform e3 of the vibration B3 at the time point t in the control period TSS2 is expressed by the following equation (18). Here, an amplitude E3 in equation (18) is the amplitude of the vibration B3 at the time point t. In the present modification example, the amplitude E3 is approximately equal to the amplitude E1. Additionally, a value θ3 in equation (18) is a value set based on the time interval between the time point t31 and the time point t and satisfies the following equation (19). Additionally, a waveform ec of the vibration BC at the time point t in the control period TSS2 is expressed by the following equation (20):

$$e3=E3\cdot\sin\{\omega t+\theta 3\} \tag{18}$$

$$\theta 3=\theta 1+(2k-1)\pi \tag{19}$$

$$ec=e1+e3=(E1-E3)\cdot\sin(\omega t+\theta 1)\approx 0 \tag{20}$$

In the present modification example, when the viscosity of ink in the determination target ejector DS is increased and an ejection abnormality has occurred in the determination target ejector DS, the detection potential signal VX detected from the determination target ejector DS by the detection circuit 33 indicates a vibration BCz, which is a composite vibration of the vibration Blz produced due to the waveform PS1 and a vibration B3*z* produced due to the waveform PS3, as illustrated in FIG. 10.

Specifically, in the control period TSS2, a waveform e3*z* of the vibration B3*z* at the time point t is expressed by the following equation (21), and a waveform ecz of the vibration BCz at the time point t is expressed by the following equation (22):

$$e3z=E3z\cdot\sin\{\omega t+\theta 3\} \tag{21}$$

$$ecz=e1z+e3z=(E1z+E3z)\cdot\sin\{\omega t+\theta 1\} \tag{22}$$

where the amplitude E3*z* is the amplitude of the vibration B3*z* at the time point t and the amplitude ECz is the amplitude of the vibration BCz at the time point t.

In the present modification example, the degree of damping of vibrations in the determination target ejector DS in the time period from the time point t11 to the time point t is larger than the degree of damping of vibrations in the determination target ejector DS in the time period from the time point t31 to the time point t. Accordingly, in the present modification example, even when "E1≈E3" holds between the amplitude E1 and the amplitude E3, the relation "E1*z*<E3*z*" holds between the amplitude E1*z* and the amplitude E3*z*. That is, the amplitude of the vibration BCz is larger than the amplitude of the vibration BC.

In the present modification example, the determination unit 8 determines, based on the detection signal SK, whether the largest value of the amplitude of the detection potential signal VX is greater than or equal to a predetermined reference amplitude. When the largest value of the amplitude of the detection potential signal VX is less than the predetermined reference amplitude, the determination unit 8 regards that the vibration BC has occurred in the determination target ejector DS, determines that the ejection state of ink in the determination target ejector DS is normal, and generates the ejection state determination information JH indicating a result of the determination. In contrast, when the largest value of the amplitude of the detection potential signal VX is greater than or equal to the predetermined reference amplitude, the determination unit 8 regards that the vibration BCz has occurred in the determination target ejector DS, determines that an ejection abnormality due to an increase in viscosity has occurred in the determination target ejector DS, and generates the ejection state determination information JH indicating a result of the determination.

In the present modification example, the driving signal Com is set such that the duration TX13 satisfies equation (17), but the present disclosure is not limited to such. For example, the duration TX13 may be determined to satisfy the following equation (23):

$$(2k-1)\frac{TC}{2}-\frac{TC}{4}<TX13<(2k-1)\frac{TC}{2}+\frac{TC}{4} \tag{23}$$

In the present modification example, the value θ1 and the value θ3 are determined to satisfy equation (19) described above, but the present disclosure is not limited to such. For example, the value θ1 and the value θ3 may be determined to satisfy the following equation (24):

$$(2k-1)\pi-\frac{\pi}{2}<\theta 3-\theta 1<(2k-1)\pi+\frac{\pi}{2} \tag{24}$$

That is, the ink jet printer 1 according to the present modification example includes the ejector D[m] that ejects ink filled in the cavity 322 in accordance with displacement of the piezoelectric element PZ[m], the driving signal generation unit 4 that generates the driving signal Com, which has the waveform PS1 provided in the time period T1 starting at the time point t11 for displacing the piezoelectric element PZ[m] in the −Z direction and the waveform PS3 provided in the time period T3 starting at the time point t31 for displacing the piezoelectric element PZ[m] in the +Z direction, and the detection circuit 33 that detects a vibration remaining in the ejector D[m] in the control period TSS2. The difference between the duration TX13 from the time point t11 to the time point t31 and the duration that is an odd multiple of a half period of a vibration produced in the ejector D[m] is shorter than one quarter of the period TC of the vibration produced in the ejector D[m].

With the ink jet printer 1 according to the present modification example, for example, the degree of difference between the amplitude of the vibration BC produced in the ejector D[m] when the viscosity of ink filled in the ejector D[m] is not increased and the amplitude of the vibration BCz produced in the ejector D[m] when the viscosity of ink filled in the ejector D[m] is increased may be larger than that in the reference example. Therefore, according to the present modification example, for example, even when the degree at which the viscosity of ink in the ejector D[m] is increased is small, the ejection state of ink in the ejector D[m] may be determined more accurately than in the reference example.

In the present modification example, the time point t31 is an example of "second time point", the time period T3 is an example of "second time period", and the waveform PS3 is an example of "second waveform".

Second Modification Example

In the embodiment and the first modification example described above, the amplitude E1 is approximately equal to the amplitude E2 or the amplitude E3, but the present disclosure is not limited to such. The amplitude E1 may be different from the amplitude E2 or the amplitude E3.

The driving signal Com according to the present modification example differs from the driving signal Com according to the embodiment in that the driving signal Com according to the present modification example includes a driving signal Com-D instead of the driving signal Com-B.

Figure 11:
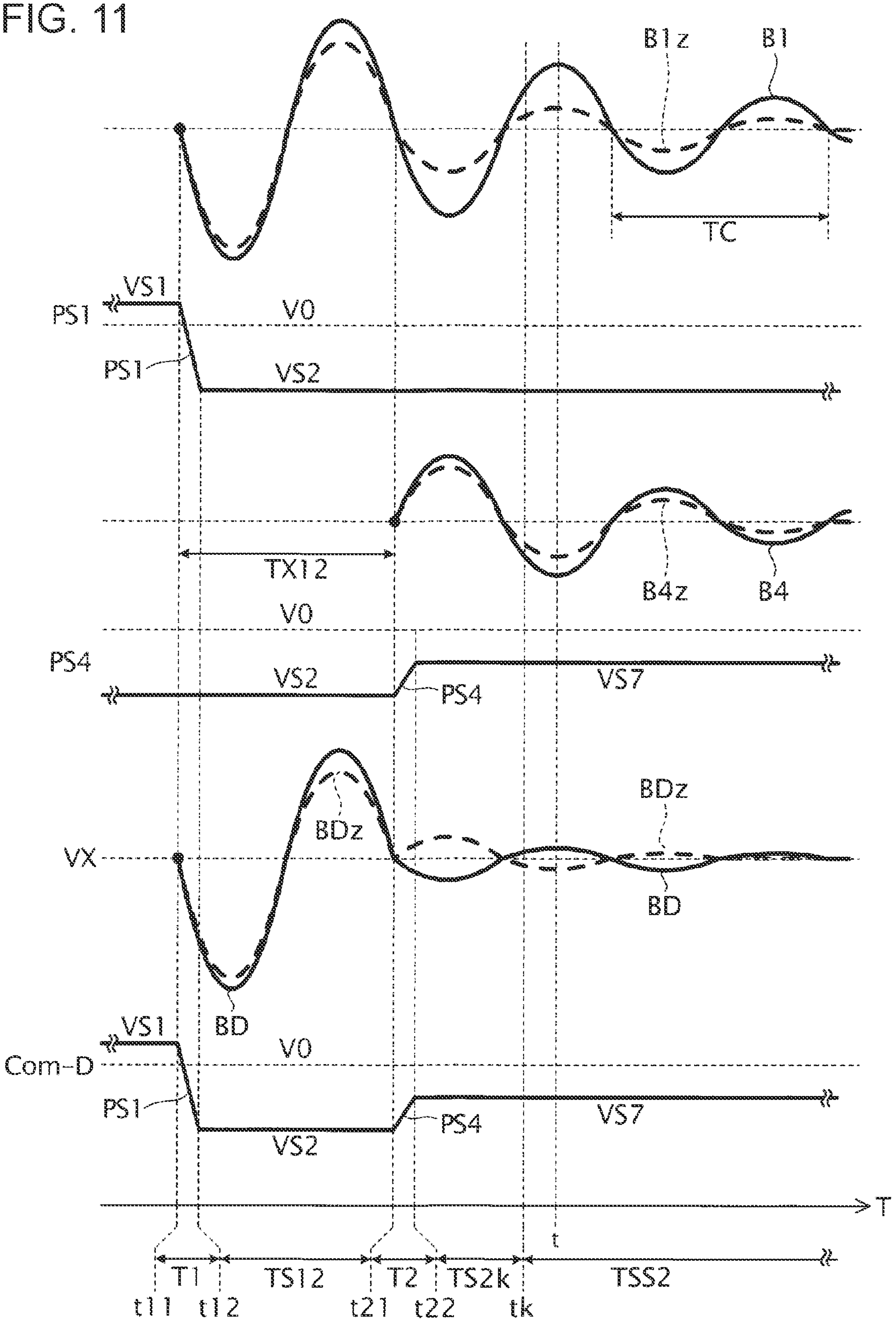
FIG. 11 is a timing chart illustrating an example of a relation between vibrations produced in the ejector and a driving signal according to a second modification example.

As illustrated in FIG. 11, the driving signal Com-D has a waveform indicating a potential that changes from the reference potential VO through the potential VS2 to a potential VS7 higher than the potential VS2 in the control period TSS1, is kept at the potential VS7 during the control period TSS2, and changes from the potential VS7 to the reference potential VO in the control period TSS3.

Specifically, in the driving signal Com-D, the waveform PS1 is provided in the time period T1 of the control period TSS1, a waveform PS4 indicating the potential that is kept at the potential VS2 during the time period TS12 of the control period TSS1 and changes from the potential VS2 to the potential VS7 in the time period T2 of the control period TSS1, and the potential VS7 is maintained during the time period TS2*k* of the control period TSS1.

In the present modification example, as in the embodiment, the supply driving signal Vin including the driving signal Com-D is supplied to the determination target ejector DS in the control period TSS1 and the control period TSS3, and the supply of the driving signal Com is stopped during the control period TSS2. In the present modification example, as in the embodiment, the detection potential signal VX indicating the potential of the upper electrode Zu is supplied from the determination target ejector DS to the detection circuit 33 in the control period TSS2.

In the present modification example, when the ejection state of ink in the determination target ejector DS is normal, the detection potential signal VX detected from the determination target ejector DS by the detection circuit 33 indicates a vibration BD, which is a composite vibration of the vibration B1 produced due to the waveform PS1 and a vibration B4 produced due to the waveform PS4, as illustrated in FIG. 11.

Specifically, a waveform e4 of the vibration B4 at the time point t in the control period TSS2 is expressed by the following equation (25). Here, an amplitude E4 in equation (25) is the amplitude of the vibration B4 at the time point t. In the present modification example, the amplitude E4 is smaller than the amplitude E1.

Additionally, a value θ4 in equation (25) is a value set based on the time interval between the time point t21 and the time point t and satisfies the following equation (26). Additionally, a waveform ed of the vibration BD at the time point t in the control period TSS2 is expressed by the following equation (27).

$$e4=E4\cdot\sin\{\omega t+\theta 4\} \quad (25)$$

$$\theta 4=\theta 1+(2k-1)\pi \quad (26)$$

$$ed=e1+e4=(E1-E4)\cdot\sin\{\omega t+\theta 1\} \quad (27)$$

In the present modification example, when the viscosity of ink in the determination target ejector DS is increased and an ejection abnormality has occurred in the determination target ejector DS, the detection potential signal VX detected from the determination target ejector DS by the detection circuit 33 indicates a vibration BDz, which is a composite vibration of the vibration Blz produced due to the waveform PS1 and a vibration B4*z* produced due to the waveform PS4, as illustrated in FIG. 11.

Specifically, in the control period TSS2, a waveform e4*z* of the vibration B4*z* at the time point t is expressed by the following equation (28), and a waveform edz of the vibration BDz at the time point t is expressed by the following equation (29). Here, an amplitude E4*z* is the amplitude of the vibration B4*z* at the time point t and an amplitude EDz is the amplitude of the vibration BDz at the time point t.

$$e4z=E4z\cdot\sin\{\omega t+\theta 4\} \quad (28)$$

$$edz=e1z+e4z=(E1z-E4z)\cdot\sin\{\omega t+\theta 1\} \quad (29)$$

As described above, when the viscosity of ink in the determination target ejector DS is increased, the damping rate of vibrations produced in the determination target ejector DS is higher than that when the viscosity of ink is not increased. The time interval between the time point t11 and the time point t is longer than the time interval between the time point t21 and the time point t. Therefore, in the present modification example, the degree of damping of vibrations produced in the determination target ejector DS in the time period from the time point t11 to the time point t is larger than the degree of damping of vibrations in the determination target ejector DS in the time period from the time point t21 to the time point t. Accordingly, in the present modification example, even when "E1>E4" holds between the amplitude E1 and the amplitude E4, the relation "E1*z*<E4*z*" may hold between the amplitude E1*z* and the amplitude E4*z*. That is, the phase of the vibration BD may be approximately equal to the phase of the vibration B1 and the phase of the vibration BDz may be different from the phase of the vibration BD.

In the present modification example, the determination unit 8 determines, based on the detection signal SK, whether the phase difference between the vibration detected by the detection circuit 33 and the vibration B1 is greater than or equal to a predetermined reference value. When the phase difference between the vibration detected by the detection circuit 33 and the vibration B1 is less than the predetermined reference value, the determination unit 8 regards that the vibration BD has occurred in the determination target ejector DS, determines that the ejection state of ink in the determination target ejector DS is normal, and generates the ejection state determination information JH indicating a result of the determination. In contrast, when the phase difference between the vibration detected by the detection circuit 33 and the vibration B1 is greater than or equal to the predetermined reference value, the determination unit 8 regards that the vibration BDz has occurred in the determination target ejector DS, determines that an ejection abnormality due to an increase in viscosity has occurred in the determination target ejector DS, and generates the ejection state determination information JH indicating a result of the determination.

In the present modification example, the value θ1 and the value θ4 are determined to satisfy equation (26) described above, but the present disclosure is not limited to such. For example, the value θ1 and the value θ4 may be determined to satisfy the following equation (30):

$$(2k-1)\pi-\frac{\pi}{2}<\theta 4-\theta 1<(2k-1)\pi+\frac{\pi}{2} \quad (30)$$

In such a manner, in the ink jet printer 1 according to the present modification example, the amplitude E1 at the time point tk of the vibration B1 produced in the ejector D[m] due to the waveform PS1 is larger than the amplitude E4 at the time point tk of the vibration B4 produced in the ejector D[m] due to the waveform PS4.

With the ink jet printer 1 according to the present modification example, for example, the degree of difference between the phase of the vibration BD produced in the ejector D[m] when the viscosity of ink filled in the ejector D[m] is not increased and the phase of the vibration BDz produced in the ejector D[m] when the viscosity of ink filled in the ejector D[m] is increased may be larger than that in the reference example. Therefore, according to the present modification example, for example, even when the degree at which the viscosity of ink in the ejector D[m] is increased is small, the ejection state of ink in the ejector D[m] may be determined more accurately than in the reference example.

In the present modification example, the waveform PS4 is an example of "second waveform" and the vibration B4 is an example of "second vibration".

In the ink jet printer 1 according to present modification example, when the difference between the phase of the vibration detected by the detection circuit 33 in the control period TSS2 and the phase of the vibration B1 is greater than or equal to a predetermined reference value, the determination unit 8 determines that there is an increase in the viscosity of ink filled in the cavity 322.

Therefore, the ink jet printer 1 according to the present modification example may reduce a decrease in the printing quality along with an increase in the viscosity of ink.

Third Modification Example

In the embodiment and the first and second modification examples, the case where the ink jet printer 1 is a serial printer is illustrated, but the present disclosure is not limited to such. The ink jet printer 1 may be a so-called line printer in which a plurality of nozzles N are provided in the head unit 3 to extend wider than the width of the recording paper P.

What is claimed is:

1. A liquid ejecting apparatus comprising:

an ejector configured to eject a liquid filled in a pressure chamber in accordance with displacement of a piezoelectric element;

a generator configured to generate a driving signal, the driving signal having:

a first waveform, provided in a first time period starting at a first time point, for displacing the piezoelectric element in a first direction, and a second waveform, provided in a second time period starting at a second time point after completion of the first time period, for displacing the piezoelectric element in a second direction opposite to the first direction; and a detector configured to detect a vibration remaining in the ejector in a detection time period starting after completion of the second time period, wherein a difference between a duration from the first time point to the second time point and a duration that is a natural number times a period of a vibration produced in the ejector is shorter than one quarter times the period of the vibration produced in the ejector.

2. The liquid ejecting apparatus according to claim 1, further comprising a determiner configured to determine, based on the vibration detected by the detector in the detection time period, whether there is an increase in viscosity of a liquid filled in the pressure chamber.

3. The liquid ejecting apparatus according to claim 2, wherein an amplitude, at a start time point of the detection time period, of a first vibration produced in the ejector due to the first waveform is approximately equal to an amplitude, at the start time point of the detection time period, of a second vibration produced in the ejector due to the second waveform.

4. The liquid ejecting apparatus according to claim 3, wherein the determiner is configured to, when an amplitude of the vibration detected by the detector in the detection time period is greater than or equal to a reference amplitude, determine that there is an increase in viscosity of the liquid filled in the pressure chamber.

5. The liquid ejecting apparatus according to claim 2, wherein an amplitude, at a start time point of the detection time period, of a first vibration produced in the ejector due to the first waveform is greater than an amplitude, at the start time point of the detection time period, of a second vibration produced in the ejector due to the second waveform.

6. The liquid ejecting apparatus according to claim 5, wherein the determiner is configured to, when a difference between a phase of the vibration detected by the detector in the detection time period and a phase of the first vibration is greater than or equal to a reference value, determine that there is an increase in viscosity of the liquid filled in the pressure chamber.

7. A liquid ejecting apparatus comprising:

a generator configured to generate a driving signal;

an ejector configured to, when supplied with the driving signal, eject a liquid; and a detector configured to detect a vibration produced in the ejector driven by the driving signal, wherein the generator is configured to generate a determination driving signal, the determination driving signal having:

a first waveform, provided in a first time period starting at a first time point, for producing a first vibration in the ejector, and a second waveform, provided in a second time period starting at a second time point after completion of the first time period, for producing a second vibration in the ejector, the detector is configured to, when the ejector is driven by the determination driving signal, detect a composite vibration of the first vibration and the second vibration remaining in the ejector in a detection time period starting after completion of the second time period, and a difference between a phase difference between the first vibration and the second vibration and an odd multiple of $\pi$ is smaller than a half of $\pi$.

* * * * *